United States Patent

[11] 3,621,314

[72] Inventors Yoshio Murayama;
 Masao Kamura, both of Tokyo, Japan
[21] Appl. No. 42,803
[22] Filed June 2, 1970
[45] Patented Nov. 16, 1971
[73] Assignee Kabushiki Kaisha Meidensha
 Tokyo, Japan
[32] Priority May 23, 1969
[33] Japan
[31] 44/47757

[54] REVERSIBLE OPERATING APPARATUS
 1 Claim, 1 Drawing Fig.
[52] U.S. Cl. .................................................. 310/101,
 318/8
[51] Int. Cl. ....................................................... H02k 49/04
[50] Field of Search ......................................... 310/101;
 318/8

[56] References Cited
UNITED STATES PATENTS
3,535,570 10/1970 Richter et al. ................ 310/101

*Primary Examiner*—D. X. Sliney
*Attorney*—Kelman and Berman

ABSTRACT: A reversible, variable-speed motor mechanism comprises a pair of two-phase induction motors rotating in opposite directions. The motors are coupled to a load by a pair of eddy-current coupling devices. The speed and direction of rotation of the load is controlled by comparing a setting signal with a signal representative of the speed of the load and then altering the excitation current fed to the eddy-current coupling devices, in an offsetting manner, until the comparison signal is zero.

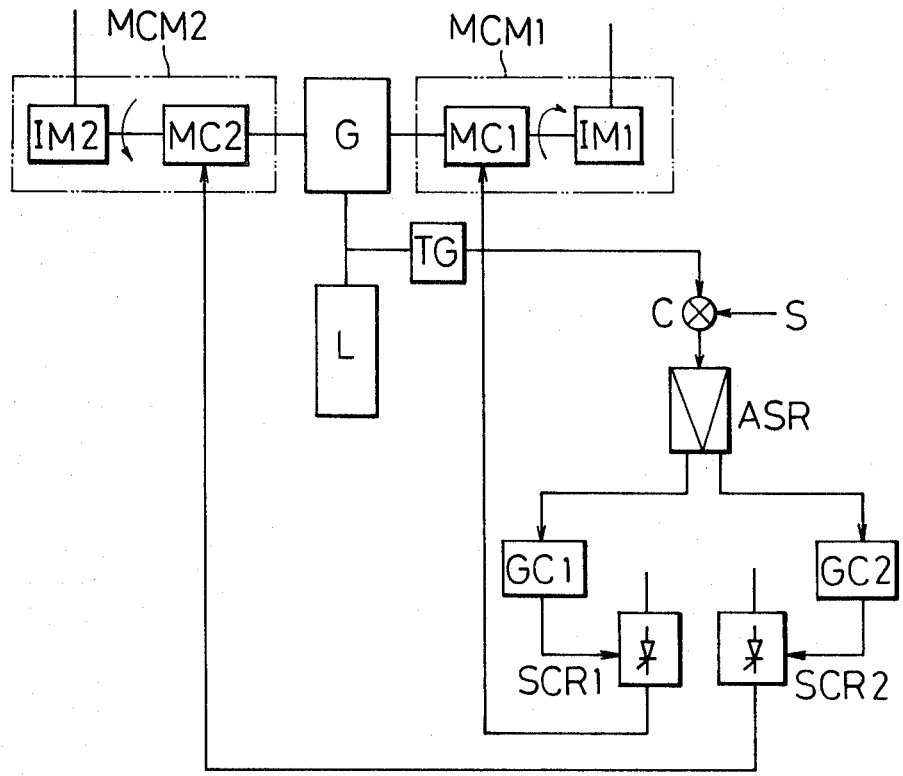

REVERSIBLE OPERATING APPARATUS

BACKGROUND OF THE INVENTION

1. Field of the Invention

Broadly speaking, this invention relates to motor mechanisms. More particularly, in a preferred embodiment, this invention relates to a reversible, variable-speed motor mechanism.

2. Discussion of the Prior Art

In industry, it is frequently necessary to supply rotational energy to a load at different speeds and with different directions of rotation. In the prior art, such a need has been met by expensive three-phase induction motors operating off variable-frequency three-phase power supplies. Such supplies themselves are expensive and prone to trouble.

An object of the present invention is to provide an inexpensive, reversible motor mechanism of simple construction which is capable of operating a load at a predetermined speed in either a clockwise or a counterclockwise direction by changing a setting signal applied thereto which operates off a conventional two-phase AC source of fixed frequency.

The construction and operation of the present invention will become apparent by reading the following description relating to one embodiment.

DESCRIPTION OF THE DRAWING

The sole FIGURE is a block diagram of a reversible variable-speed motor mechanism according to the present invention.

DETAILED DESCRIPTION OF THE INVENTION

The construction of an illustrative embodiment of the present invention will be described in detail with respect to the drawing. In the drawing, IM 1 and IM 2 denote induction motors whose rotational directions are different and MC 1 and MC 2 denote two eddy current coupling units which are respectively coupled to the motors IM 1 and IM 2. Motor IM 1, IM 2 and coupling units MC 1, MC 2 form motor units MCM 1 and MCM 2 respectively, symbol G representing a rotation-transmitting mechanism for coupling the respective coupling units MC 1, MC 2 with a load L, for example, a gear mechanism; TG is a small generator for detecting the speed (in r.p.m.) of the load L; C is a comparator for comparing a detection signal from the generator TG with a set signal S which is provided for setting the rotational direction and desired speed for the load L; ASR denotes an automatic speed control device for generating an output signal on either one of two output terminals, in accordance with desired rotational direction, said device having the deviation signal from Comparator C as an input; GC 1 and GC 2 are gate control devices for the thyristors which are to be controlled by the control device ASR; and SCR 1 and SCR 2 are thyristors whose ignition phase is adjusted by the output signals of the respective control devices GC 1 and GC 2, and which perform the excitation adjustment for the respective eddy current coupling units MC 1 and MC 2.

The description of the operation of the above-described embodiment is as follows. When on set signal S is impressed on the comparator C, no signal is generated on either one of the output terminals of the automatic speed control device ASR, and no gate control of either one of the thyristors SCR 1 and SCR 2 is effected by means of the gate control devices GC 1 and GC 2, so that the eddy-current coupling units MC 1 and MC 2 remain unexcited. It therefore follows that the respective motors IM 1 and IM 2 only rotate in opposite directions, and the load L is not driven.

If a set signal S, which is representative of the desired number of revolutions per minute in the positive rotational direction (which is herein assumed to be the clockwise direction), is impressed upon the comparator C, the deviation signal, namely the difference between the zero output of the small generator TG (for detecting the number of revolutions per minute of the load L) the load L being stopped, and the set signal S is impressed upon the automatic speed control device ASR. This deviation signal is properly amplified and the thyristor SCR 1 is ignited, through the gate control device GC 1 by means of the signal transmitted by one of the output terminals of the automatic speed controller, and thus the eddy current unit MC 1 is excited. Accordingly, the rotation of the motor IM 1 is transmitted to the load L by means of the coupling MC 1 and gear mechanism G and the load L is rotated in the positive direction. When the load L is rotated, the number of revolutions it makes per minute is detected by the generator TG, and the detection signal therefrom is applied to the comparator C and compared with the set signal S. Next the deviation signal from comparator C is applied to the automatic speed control device ASR, and the ignition phase of the thyristor SCR 1 is adjusted, through the gate control device GC 1, by means of the output signal from the automatic speed control device, and the excitation of the eddy-current coupling MC 1 is changed according to the adjustment of the ignition phase of the thyristor SCR 1. Consequently, the rotation of the motor IM 1 is transmitted to the load L, which is consequently driven at a speed which is proportional to the excitation adjustment of the coupling MC 1, and thus the load L is rotated in the positive direction. The above-mentioned motion is continued until the deviation between the detection signal of the generator TG and the set signal S becomes zero, when the excitation of the eddy-current coupling unit MC 1 becomes constant, and the load L rotates at the desired speed and in the desired rotational direction, namely, the positive rotational direction.

When the set signal S is set to a desired speed in the reverse rotational direction (which in this instance is assumed to be the counterclockwise direction) and is impressed upon comparator C, a signal is generated on the other output terminal of the automatic speed control device, and thus the ignition phase of the thyristor SCR 2 is adjusted, through the gate control device GC 2, and the excitation of the eddy-current coupling unit MC 2 is adjusted so that the load L rotates with the desired speed in the reverse rotational direction. In this case, a signal is not generated on the other output terminal of the automatic speed control device ASR, and, therefore, the thyristor SCR 1 is not ignited, and the eddy-current coupling unit MC 1 assumes a nonexcited condition, whereby the rotation of the motor IM 1 is not transmitted to the load L.

In the above-described embodiment of the present invention, one of the eddy-current coupling units MC 1 and MC 2 is excited according to the desired rotational direction, and one of the motors IM 1 and IM 2 is coupled to the load L, but it is possible to work the present invention by employing a device which is capable of generating the signal in both output terminals of the automatic speed control device ASR, according to the desired rotational direction and only changing one of the signals according to the desired rotational direction and desired speed and by also making either one of the excitations of the respective eddy-current coupling units MC 1 and MC 2 constant, and changing the other excitation so as to transmit the difference in speed of both motors IM 1 and IM 2 to the load L.

One skilled in the art will appreciate that this invention is not limited to the above-described embodiments, and that apparatus which may be easily conceived therefrom by modification thereof are included in the scope of the present invention.

As will be obvious from the detailed description of the present invention, the following advantages can be obtained from the present invention.

The load can be operated with the desired speed (maximum number of revolutions per minute will be determined by the number of revolutions per minute of the induction motor) in either the positive or negative directions by changing the set signal.

Because this apparatus consists of two inexpensive eddy-current coupling units, two induction motors, simple thyristor control devices and other simple devices, the construction is simple and inexpensive and yet the same degree of control can be performed as with reversible operation of the load by means of induction motors using the conventional complicated and expensive three-phase variable-frequency power source.

What we claim is:

1. A reversible, variable-speed motor mechanism, which comprises:

first and second induction motors adapted for rotation in different directions of rotation from each other;

first and second eddy-current coupling devices respectively connected to said first and second induction motors;

a rotation-transmitting mechanism for coupling said first and second eddy-current coupling devices to a load;

a generator, coupled to said rotation-transmitting mechanism, for generating a signal which is proportional to the rotational speed of said load;

a comparator for comparing the output of said generator with a setting signal to generate a control signal when the output from said generator is less than said setting signal;

an automatic speed-controlling circuit having an input lead and first and second output leads, said input lead being connected to the output of said comparator, said speed-controlling circuit producing an amplified version of said control signal on said first output lead for positive directions of rotation and on said second output lead for negative directions of rotation; first and second gating circuits connected to said first and second output leads, respectively; and first and second thyristor devices interconnecting an external source of power to the excitation windings of said first and second eddy-current coupling devices, respectively, the control electrodes for said first and second thyristor devices being connected to said first and second gating circuits, respectively, whereby at least one of said thyristor devices is conducting to pass excitation current to said eddy-current coupling devices when said comparator is generating said control signal.